United States Patent [19]

Hovell

[11] Patent Number: 5,905,971
[45] Date of Patent: *May 18, 1999

[54] AUTOMATIC SPEECH RECOGNITION

[75] Inventor: Simon Alexander Hovell, Ipswich, United Kingdom

[73] Assignee: British Telecommunications public limited company, London, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/709,685

[22] Filed: Sep. 10, 1996

[30] Foreign Application Priority Data

May 3, 1996 [GB] United Kingdom .................. 9609321

[51] Int. Cl.$^6$ ....................................................... G10L 7/08
[52] U.S. Cl. ........................................... 704/257; 704/254
[58] Field of Search ................................... 704/257, 254, 704/256, 243, 249, 9, 200

[56] References Cited

U.S. PATENT DOCUMENTS

| | | | |
|---|---|---|---|
| 4,805,219 | 2/1989 | Baker et al. | 381/43 |
| 5,440,663 | 8/1995 | Moese et al. | 704/255 |
| 5,513,298 | 4/1996 | Stanford et al. | 395/2.52 |
| 5,621,859 | 4/1997 | Schwartz et al. | 395/2.65 |

FOREIGN PATENT DOCUMENTS

0590173 A1  9/1992  European Pat. Off. .......... G10L 5/06

OTHER PUBLICATIONS

Young, "The General Use of Tying in Phoneme–Based HMM Speech Recognisters", Speech Processing 1, San Francisco, Mar. 23–26, 1992, vol. 1, Institute of Electrical and Electronics Engineers, pp. 569–572, XP000341210.

Woodland et al, "Large Vocabulary Continuous Speech Recognition Using HTK", Speech Processing 2, Adelaide, Apr. 19–22, 1994, vol. 2, 1994, IEEE, pp. 125–128, XP002016226.

Chou et al, "An Algorithm of High Resolution and Efficient Multiple String Hypothesization for Continuous Speech Recognition Using Inter–Word Models", Speech Processing 2, Adelaide, Apr. 19–22, 1994, vol. 2, 1994, IEEE, pp. 153–156, XP002016227.

*Primary Examiner*—Richemond Dorvil
*Attorney, Agent, or Firm*—Nixon & Vanderhye P.C.

[57] ABSTRACT

Speech recognition is carried out by matching parameterized speech with a dynamically extended network of paths comprising model linguistic elements (12b, 12c). The units are context related, e.g. triphones. Some elements cannot be converted to models at the time when it is necessary to incorporate the element into the paths because the context is not defined at the relevant time. In order to allow transfer the element is transferred as a place marker (21, 22, 23 24) which is converted when a later extension completes the definition of the triphone. The place markers (12a) can be used to identify the locations for subsequent extensions.

22 Claims, 8 Drawing Sheets

| CENTRE | LEFT | RIGHT | MODEL | ADDRESS |
|--------|------|-------|-------|---------|
| A | C | T | (a1) | 111 |
| A | S | T | (a2) | 112 |
| EA | L | P | (e1) | 113 |
| E | M | T | (e2) | 114 |
| EE | F | D | (ee1) | 115 |
| EE | L | P | (ee2) | 116 |
| L | S | E | (l1) | 117 |
| L | S | EE | (l2) | 118 |
| L | T | E | (l3) | 119 |
| P | E | T | (p1) | 120 |
| P | EE | S | (p2) | 121 |
| S | P | T | (s1) | 122 |
| S | T | A | (s2) | 123 |
| S | T | E | (s3) | 124 |
| S | T | L | (s4) | 125 |
| T | A | L | (t1) | 126 |
| T | A | P | (t2) | 127 |
| T | A | S | (t3) | 128 |
| T | P | S | (t4) | 129 |

AUTOMATIC SPEECH RECOGNITION

This inventions relates to automatic speech recognition, and more particularly it relates to automatic speech recognition using context related elements such as triphones.

Automated speech recognition has many potential applications, such as dictation systems and for the speech control of a variety of mechanisms such as video recorders. Automatic speech recognition could also be used for the remote control of household equipment, e.g. by telephone. There are many telephone services which can be implemented by automatic speech recognition coupled with synthetic speech, e.g. a wide variety of services using an automated index. In many applications a failure to recognise the speech is regarded as an acceptable result. For example, a speaker may make a mistake and, if there is a fault, it may not be that of the automatic system. A system is often designed so that faulty or inappropriate utterances are not recognised, e.g. the system may ask for a repeat.

Speech recognition is usually carried out by matching parameterised samples of a speech signal with a network which defines a plurality of paths wherein each path represents a possible utterance. Parameterised speech is well understood in the art of speech recognition and persons skilled in the art will be aware of several techniques for parameterisation. The paths are formed of successions of model speech elements, e.g. model phonemes. The term "model" indicates that the element is represented in a form which is suitable for direct comparison with a parameterised sample. Each comparison generates an elementary metric or metrics which indicate the similarity between the model element and the parameterised sample. The elementary metrics are accumulated over the paths and partials paths and this establishes which paths or partial paths most closely resemble the received signal. To begin with, there are many potential paths and the recognition is equivalent to selecting which alternative constitutes the best match for the received signal.

Complicated or elaborate embodiments of automatic speech recognition need to provide a large number of alternatives for the matching process, i.e. they must use many paths. A path can be regarded as a series of partial paths. Because many utterances start the same and then diverge many paths start with the same partial path and then they diverge again and again so that a partial path may be common to many complete paths. Thus it is convenient to store the paths as a network which defines all the paths and partial paths included therein. The recognition process is equivalent to finding the best path through the network.

This invention uses a dynamic network. This means that only an initial network is defined when the recognition begins and partial paths are added to the network from time to time, e.g. at the ends of the various partial paths, and each extensions usually takes the form or a complete unit, e.g. a complete word or a syllable. These units are formed of symbolic elements e.g. (phonemes) which are not suitable for matching against parameterised samples. Before the symbolic elements can be used for recognition they must be converted to model elements, i.e. to a form which can be matched against the parameterised samples.

In simple automatic speech recognition, there is a one-one correspondence between the symbolic and the model elements. This makes conversion easier but it tends to degrade the matching because in practice the pronunciation of an element such as a phoneme depends on its context. Using model elements that represent a symbolic phoneme in the context of its neighbouring symbolic phonemes produces a marked improvement in recognition accuracy. In other words a symbolic element (phoneme) has a variety of different pronunciations and a plurality of different model elements (phonemes) is needed to represent this variety, i.e. one model element (phoneme) is needed for each of the pronunciations. This invention uses context dependent model elements and, more particularly, model elements which depend on the symbolic elements which follow. In the preferred embodiment, this invention uses triphones, that is each model phoneme relates to only one symbolic phoneme but the preceding and following symbolic phonemes are taken into account.

The invention will now be described by way of example with reference to the accompanying drawings in which.

Figure 1:
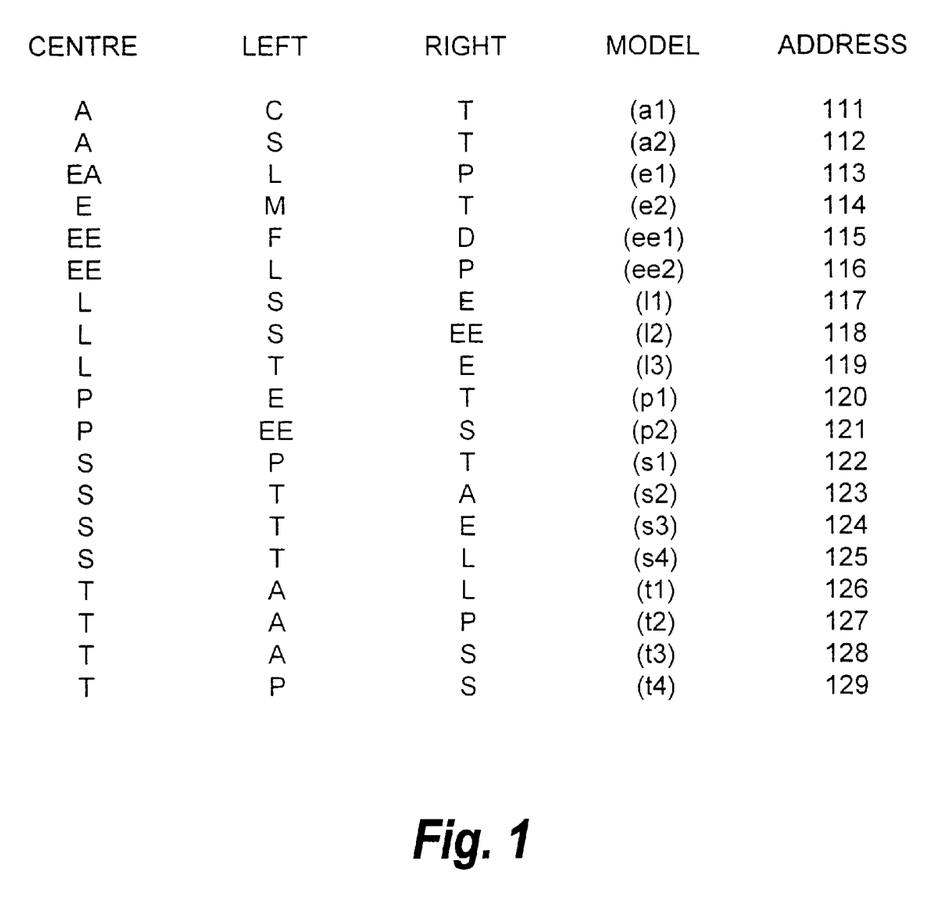
FIG. 1 illustrates a store for converting symbolic phonemes to model phonemes using triphones.
Figure 5:
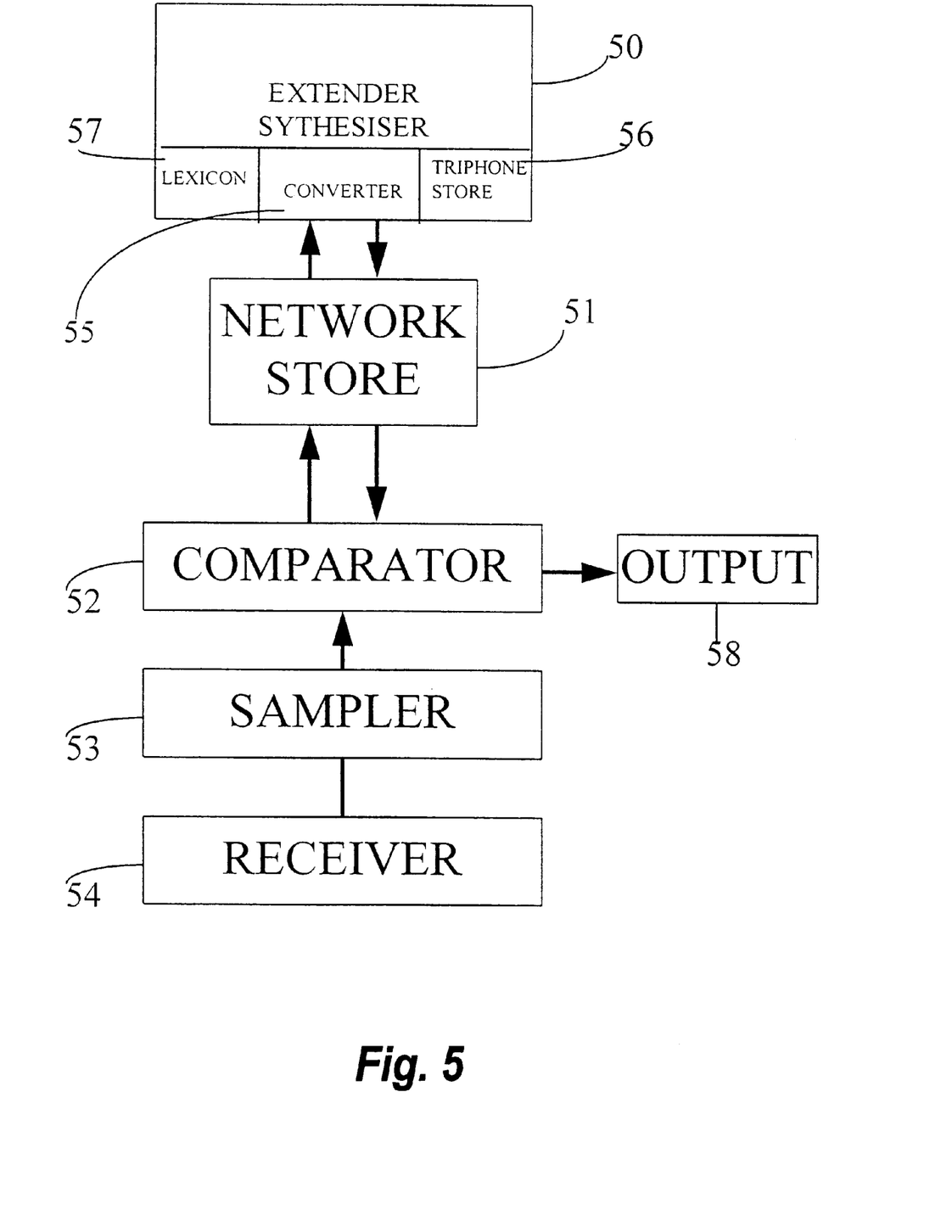
FIG. 5 illustrates equipment for carrying out the method.

FIG. 1 illustrates the content of a triphone store which also appears as item 56 of FIG. 5. Realistically, many more entries are included but only a few can be shown. In particular, items representing non-speech features such as "breath sound" and "channel noise" are usually included. The items shown in FIG. 1 are all triphones, i.e. each item comprises the phoneme itself together with its left neighbour (predecessor) and right neighbour (successor.)

FIG. 1 has a column headed "CENTRE" which identifies the symbolic phoneme to be converted. The columns headed "LEFT" and "RIGHT" identify the predecessor and the subsequent phonemes. The "models" are indicated by lower case in brackets because it is impractical to display the substantial amount of data needed to define a model (in any case the models are conventional and well known in the art.) The models are numbered and this emphasises that there are a plurality of model phonemes to each symbolic phoneme. The use of triphones requires that the symbolic phoneme be identified in the column headed "CENTRE" and the symbolic phonemes to the left and right be identified in the columns so headed. This identifies the appropriate triphone to convert the central element in its context.

Consider the conversion of the words "LEAPT" and "MET". Although conventional spelling suggests otherwise "EA" in "LEAPT" is not only a single phoneme but it is the same phoneme as "E" in "met". However the contexts are different and it is clear that the addresses 113 and 114 of FIG. 1 make the necessary conversion based on a triphone. In neither word can the symbolic phoneme "T" be converted because there is no right phoneme to define the appropriate triphone. This invention uses a dynamic network and each partial path of the network is extended by one unit (e.g. a word) at a time. The unit is in symbolic phonemes and it is necessary to convert to model phonemes before comparison with samples is possible. When the conversions are made each partial path, (and there are many) has a final symbolic phoneme which is not (yet) part of the triphone. Because the contexts of the last phonemes are not defined they cannot be converted. This is a major problem for the use of context related elements in dynamic networks. When the context is a triphone the terminology "cross-word triphones" is often used because the left and right elements of the triphone are located in different words. The problem is then known as "the problem of cross-word triphones".

According to this invention, which is more fully defined in the claims, a "place marker" is employed to overcome the problem. A place marker is similar to a model phoneme in that is can be placed in a path but it contains none of the information needed for comparison. This it can be regarded as a dummy model. More importantly the place marker identifies a symbolic phoneme, e.g. one which was not converted when it was placed in the network (the reason for the non-conversion being that the context was not adequately determined at the time of the insertion.)

A place marker identifies places for future path extensions and it can also be used to identify the end of a partial path.

Since the symbolic element identified by a place marker is not suitable for comparison with a parameterised sample, a place marker will need to be updated after it has been incorporated into a path and this updating will take place at one or more subsequent extensions of the path (and hence the network of which the path is part.) It almost always occurs that the path will branch from the place marker at the time of the extension. This means that there will usually be a plurality of extensions branching from the place marker. It is to be expected that a plurality of extensions would constitute a plurality of different contexts for the place marker and, therefore, a plurality of different model elements will be required because the model elements are context related. Two methods of updating, i.e. replacement and continuation, will now be described.

REPLACEMENT METHOD

In the replacement method, the place marker is substituted for the context related model element which the place marker defines as a symbolic element. As mentioned above, this replacement requires a plurality of different model elements in order to cope with the plurality of different contexts. Once the place marker has been removed its location is lost and no further extensions can be made from that location. It is, therefore, appropriate to make all of the different extensions on the same occasion.

CONTINUATION METHOD

In the continuation method, the place marker remains in the network as long as its path remains. The place marker is "blank" in respect of information needed for comparison with parameterised samples and, therefore, the place marker plays no part in the comparison and it does not affect the selection of the path. The updated extensions continue from the place marker and, as necessary, several different extensions may continue from the same place marker. Each extension conveniently begins with the element identified in the place marker and, since the context of this element is now fully specified, the element can be converted to the appropriate context related model form. Clearly, the place marker will not be at the end of the path after the path has been extended. Nevertheless the place marker remains in the path and it can be located and used for further extensions in which extra branches are created.

The invention includes the following methods:
(a) Extending paths and networks using place markers,
(b) Recognition of speech using dynamic networks which include place markers,
(c) Control of equipment by speech recognised by (b),
(d) Methods (a) to (c) including the use of telecommunications.

The invention also includes apparatus for carrying out methods (a) to (d) as indicated above.

If desired, a place marker may contain additional information, e.g. an identification of the word or unit terminated by the place marker. (When the extension method is used the place marker remains in the path and any additional information contained therein will also remain in the path. This information can, therefore, be accessed if it is required.)

The use of place markers in accordance with the invention will now be described with reference to FIGS. 1 to 5.

Figure 2:
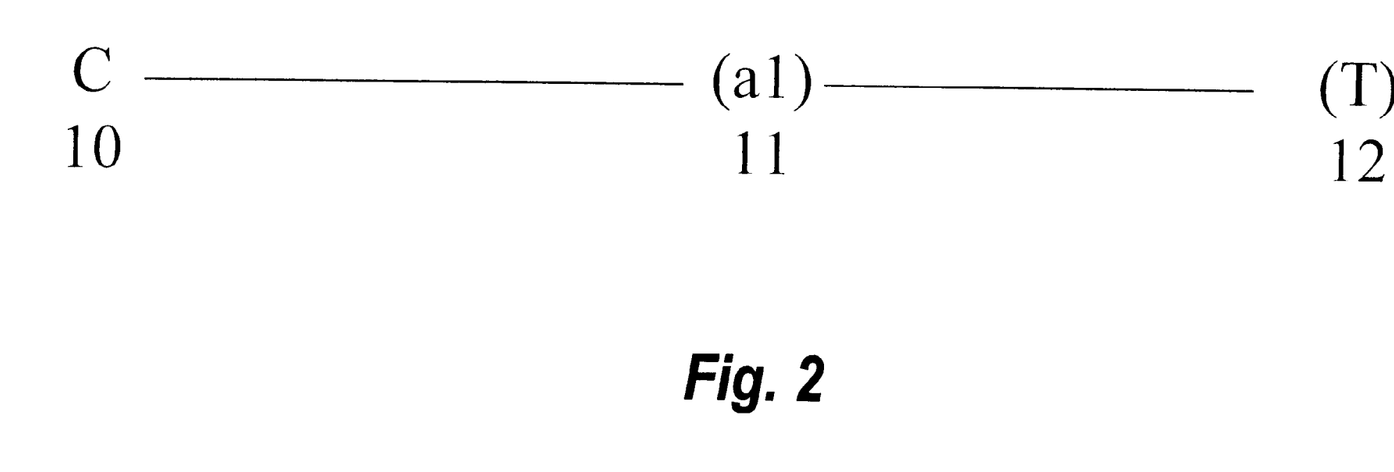
FIG. 2 shows the end of a partial path.

FIG. 2 relates to the extension of one partial path of a network and, (for illustration) it will be assumed that the partial path ends with the word "cat". Eventually all of the paths will be extended and the process is iterative because each of the extensions is carried out in substantially the same way. Since all of the iterations are substantially the same only one will be described, i.e. the one which extends this partial path.

The extension under consideration is achieved by adding a plurality of words to the end of the partial path shown in FIG. 2 and the "C" (10) indicates the remainder of the network. Since "C" was converted during a previous iteration it plays no part in this (or any other future) iteration. The "A" (11 of FIG. 2) of "cat" was also converted and it is shown as the model phoneme (a1), address 111 of FIG. 1. Nevertheless, it is needed to help define the triphone which follows.

The "T" of cat (12 of FIG. 2) has not (yet) got a successor so it cannot be converted to a model based on a triphone. It was, however, necessary to place the "T" into the net at a previous iteration and therefore a place marker was used. The place marker 12 also marks the end of a partial path and it cannot be matched with parameterised samples.

The equipment (which is shown in FIG. 5 and described in greater detail below), includes a extender 50 which includes a lexicon 57 and the triphone store 56 which is illustrated in greater detail in FIG. 1. (The lexicon 57 and the triphone store 56 are both storage areas for signals representing the various items. These signals are in a form suitable for automatic processing.) The lexicon 57 contains all the words which are acknowledged by the equipment; it may also contain other units such as syllables or any items which are of significance to a particular application. The extender 50 can extend any partial path included in the network by outputting units, e.g. words, for the extension.

To illustrate the present iteration it will be assumed that the extender outputs the following list of four words.

SAT
SL(EE)PS
SLEPT
L(EA)PT

Four words are enough for illustration but a "real" list might be much longer. In the words "sleeps" and "leapt", the brackets indicate that "ee" and "ea" are single symbolic phonemes even though there are two letters.

In order to prepare for conversion into model phonemes followed by addition to the network these words are put into the form of a tree. The tree is to be added at the location of the place marker 12 of FIG. 2 and the time has now come for the symbolic phoneme contained in the place marker 12 to be converted to a model phoneme. Therefore the place marker 12 and its preceding phoneme 11 are incorporated into the tree. Specifically, the preceding phoneme 11 and the place marker 12 constitute the start of the tree.

The tree is formed from the four words, the place marker 12 and the preceding phoneme 11. The tree is shown in FIG. 3.

Figure 3:
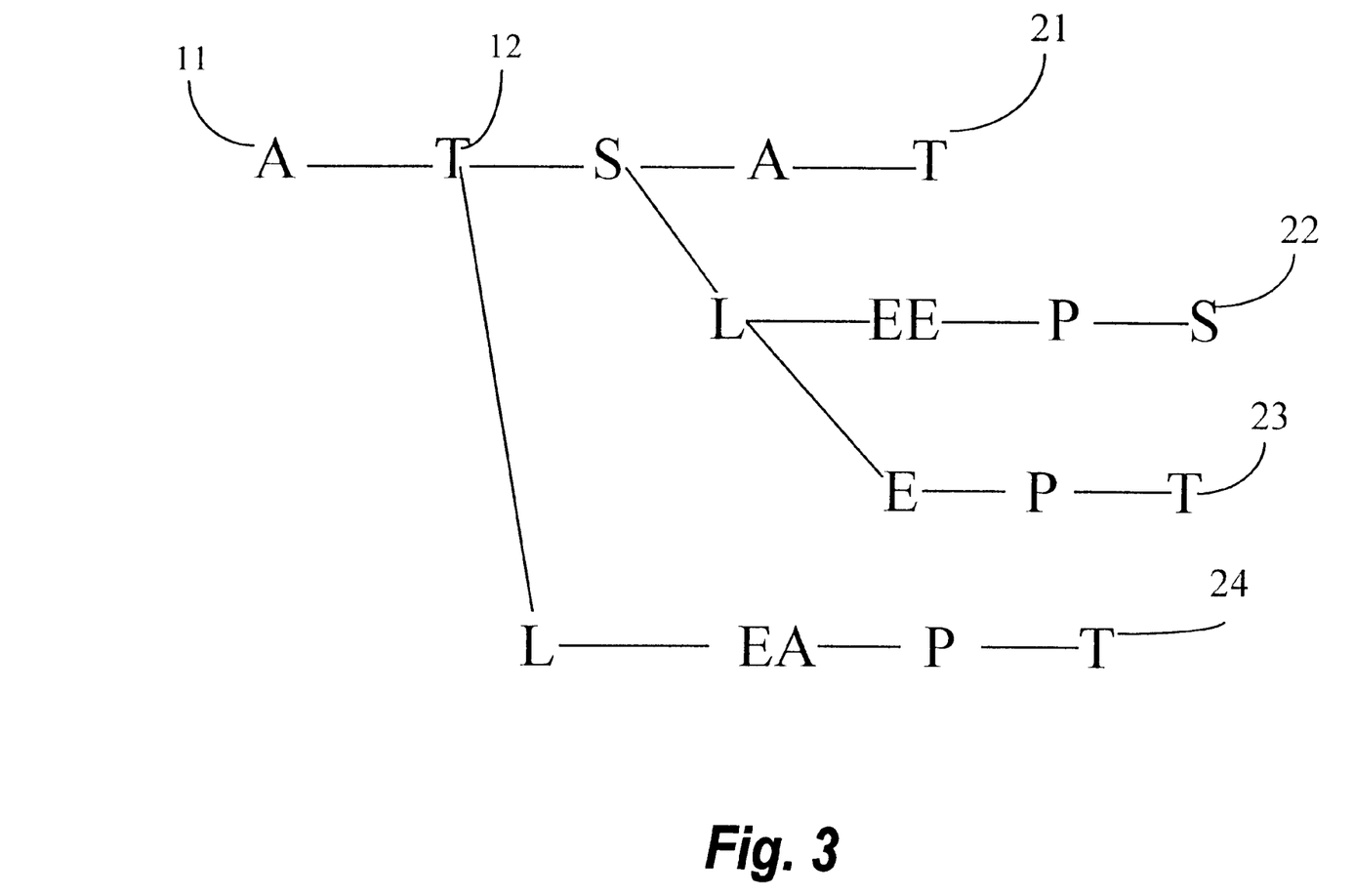
FIG. 3 shows a tree, in symbolic phonemes, for addition to a network.

All of the items shown in FIG. 3 except "ends" 21, 22, 23 and 24 and the initial letter "A" (11) are in defined triphones which are contained in the store 56 (see also FIG. 1.) Therefore the conversions are defined. The initial "A" does not need to be converted because it is already converted into a model phoneme. It is needed in the tree because it defines the conversion of item 12 which was obtained from the place marker 12 of FIG. 2. The ends 21, 22, 23 and 24 cannot be converted into triphones because the following elements are not yet determined. The non-conversion would be a major obstacle because the tree of FIG. 3 cannot be merged into the network without complete conversion. According to this invention the ends 21, 22, 23 and 24 are converted into place markers and the network can accommodate place markers.

Figure 4A:
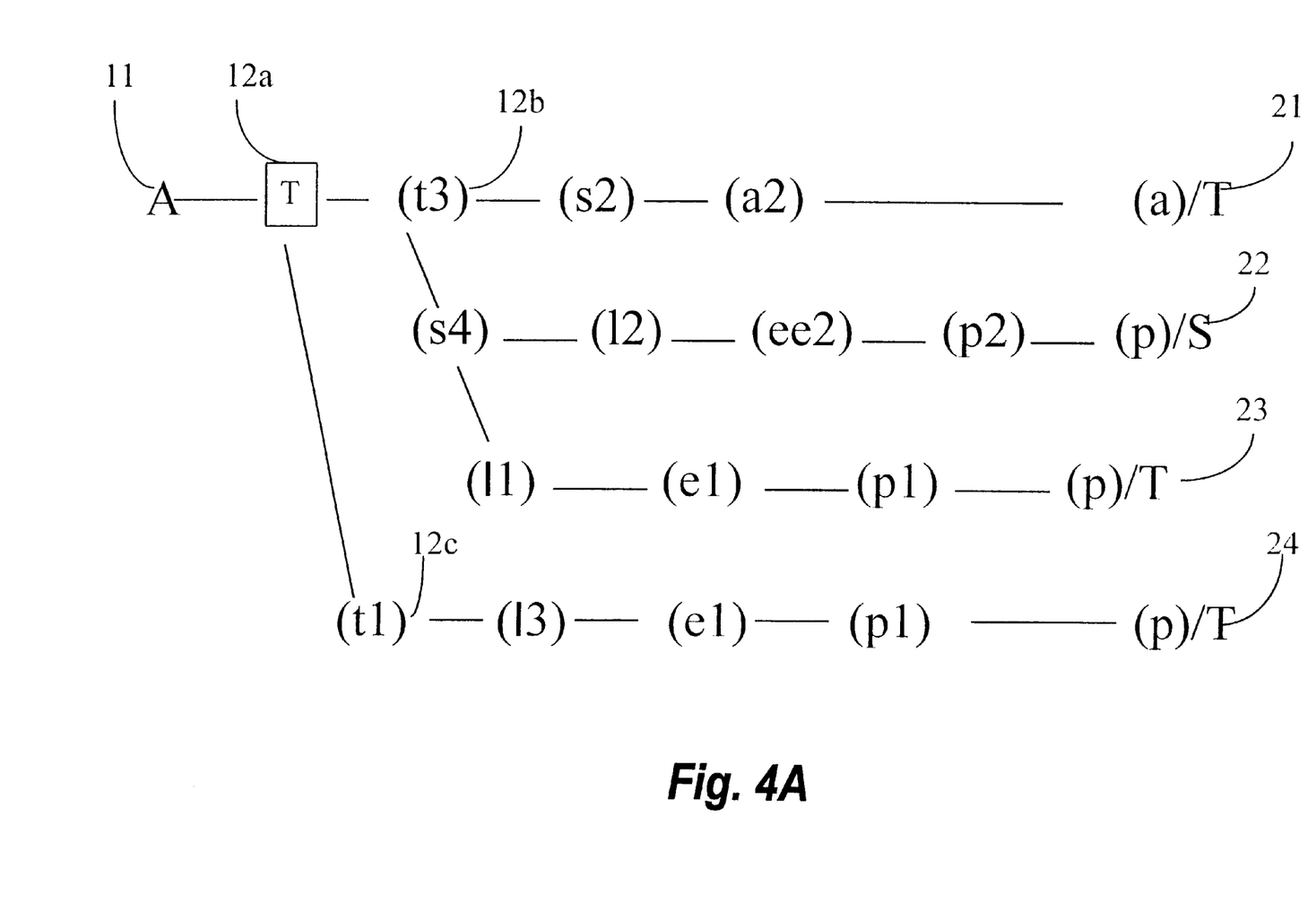
FIG. 4a shows the tree of FIG. 3 converted to model phonemes.
Figure 4B:
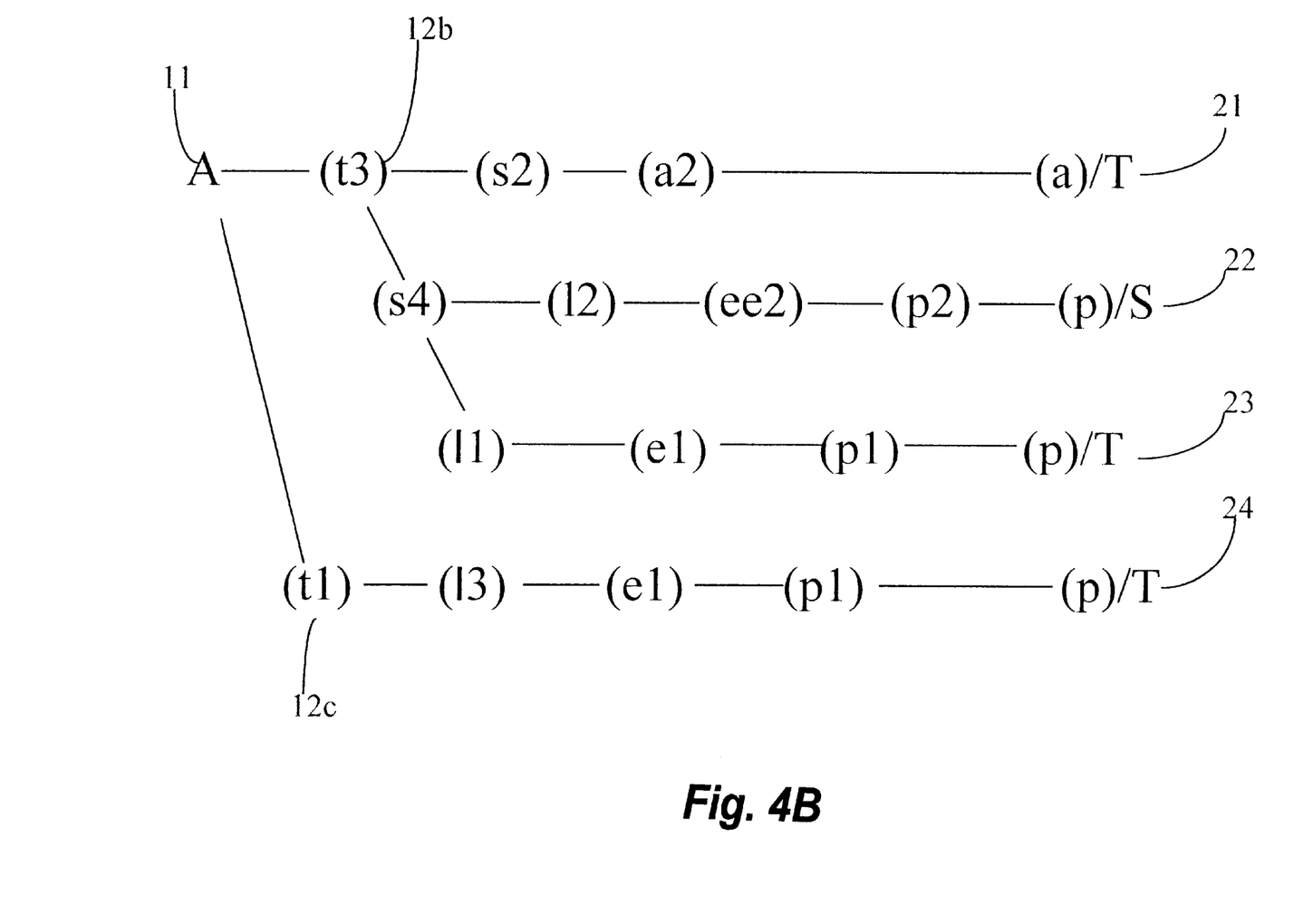
FIG. 4b shows an alternative to FIG. 4a wherein the place markers are removed from the tree.

FIG. 4 shows the result of the conversion and the merging with the previous network. Item 11 is the previous "last converted" element. Item (12a) is the old place marker which is retained unchanged. The symbolic phoneme contained in the place marker 12a is now converted into two different model phonemes because the example illustrates two different contexts. Thus, in one branch, the symbolic phoneme of the place marker 12a becomes model phoneme 12b from address 128 of the phoneme store 56. This give the model phoneme (t3) for T preceded by A and followed by S. In a different branch of the network the symbolic phoneme from the place marker 12a becomes (t1) which is item 12c from address 126 of the phoneme store 56. This version is selected because, in this branch of the network, T is preceded by A and followed by L. The old network has now branched so that there are now four new place markers 21, 22, 23 and 24. These will serve as starting points for extension in future iterations when the symbolic phonemes contained in them will be replaced by model phonemes as described above.

As can be seen from FIG. 4a the place markers remain in the network after conversion. These place markers contain no information for comparison with samples and, therefore, they do not affect the choice of the path. Nevertheless, the place markers occur at places where the network branches and they can be used to define the network. As mentioned above the place markers contain a symbolic phoneme for conversion and they may contain extra information, e.g. the preceding phoneme to define a triphone. As is illustrated by the place markers 21 to 24, place markers correspond to units inserted into the network and, if desired, a place marker may identify the unit from which it was derived.

In an alternative embodiment (illustrated in FIG. 4b) the place markers are removed when the phonemes contained in them are converted to models. Clearly, when the place markers are removed there is no information associated with place markers but, as can be seen from FIG. 4b, the structure of the network is still defined.

In another alternative, not illustrated the integrity of the units is preserved. The tree shown in FIG. 3 is not formed because each unit is separately converted to model phonemes and place markers. The converted units are then added to the network as single entities.

The equipment used to extend the network is illustrated in FIG. 5. It comprises an extender 50 for extrapolating an existing path. The extender 50 includes a lexicon 57 for storing signals which represent the symbolic phonemes of units such as words and syllables. It also includes a triphone store 56 for storing the signals used by a converter 55 which converts symbolic phonemes to model phonemes. The is operatively connected to a network store 51 so that can add extensions to the network stored therein. The extender can also obtain the ends of partial paths, e.g. symbolic phonemes contained in place marker from the network store 51 to constitute input for the extensions.

The equipment also includes a receiver 54 for acquiring a speech signal for sampling and parameterisation. The signal is preferably in the form of a digital waveform; if an analogue signal is provided an analogue-to-digital converter (not shown) is included. A sampler 53 carries out the parameterisation, and there are usually 50 to 100 samples per second. (Telephony digital speech usually has 8000 samples per second.) The comparator 52 matches the samples with the network held in the store 51 until the best path has been identified and this is output to the interface 58 which is adapted to control attached equipment (not shown in FIG. 5) or to provide confirmation of the identification, e.g. as an audio or visual signal, optionally by a telecommunications system.

Figure 6:
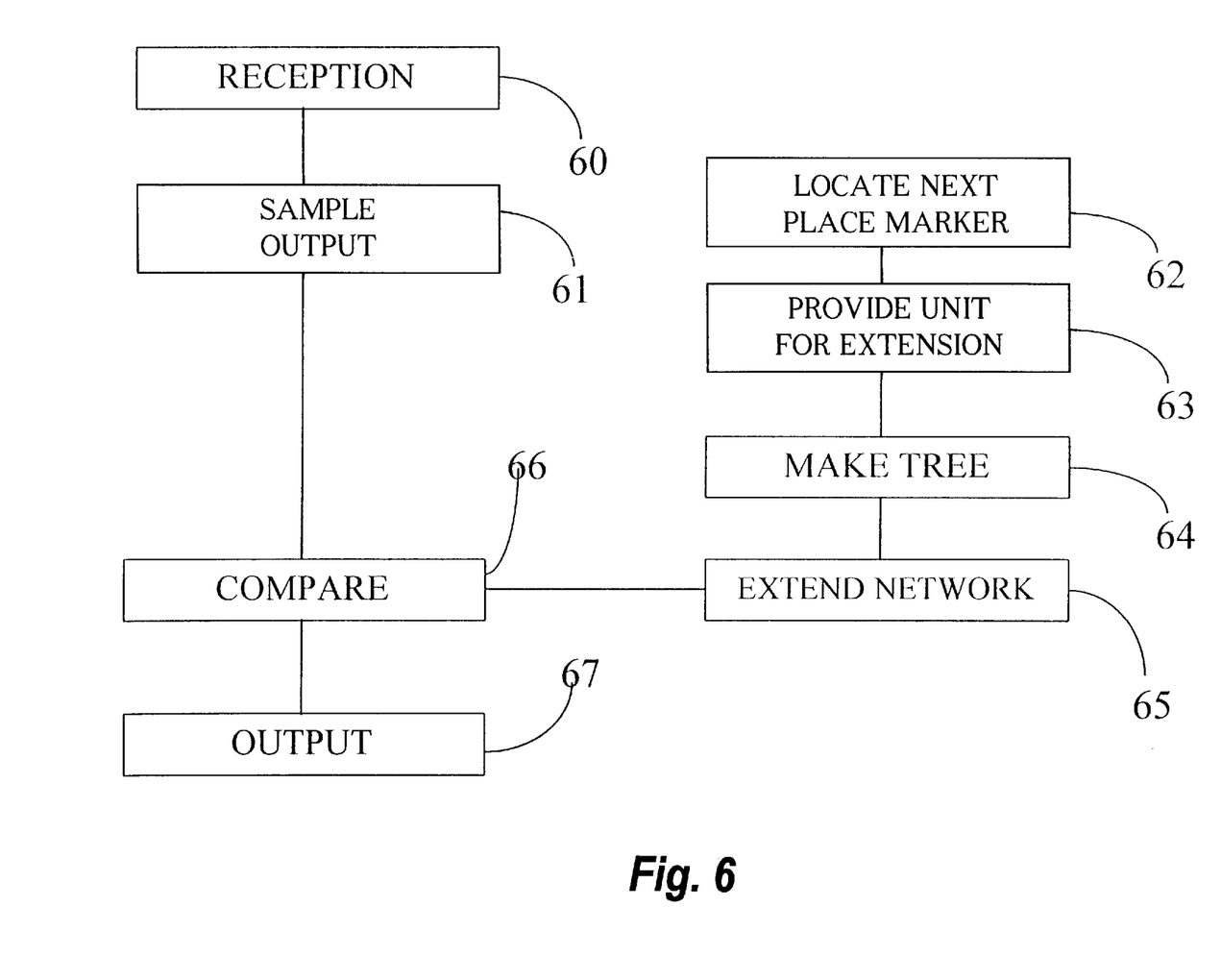
FIG. 6 is a flow sheet for the method.

A flow sheet of the method, illustrating an iteration for extending a path, is illustrated in FIG. 6.

There are three features of the flow sheet, i.e. the reception and sampling, the comparison and the extension of the network.

The and sampling ampling are indicated in a box 60 of the flow sheet and the sampling in box 61.

Network extension is indicated in boxes 62–64 and it comprises the following major steps.

BOX 62

The existing network (in the store 51) is scanned and one of the place markers is selected. The place marker determines the point at which the next extension will be added. Usually it also identifies the end of a partial path.

BOX 63

The extender 50 selects units, in signals representing symbolic phonemes, from the lexicon 57.

BOX 64

The units selected in box 63 are assembled in the form of a tree of symbolic phonemes. The placer marker selected in box 62 is included as the beginning of the tree.

BOX 65

The tree assembled in box 64 is converted into model phonemes and the end phonemes are converted into place markers which will be selected in future executions of box 62. The symbolic phoneme in the place marker selected in box 62 is also converted into a model phoneme. These conversions are carried out using the phoneme store 56 (the contents of which are illustrated in FIG. 1). After conversion the tree is added to the network which is contained in the store 51.

It is important to recognise that the conversion to model phonemes occurs in box 65 whereas the identification of the phonemes and their contexts is achieved in the previous boxes 63 and 64. When these boxes are executed the end phonemes do not have a context so they cannot be converted. The place markers are compatible with the network even though they are not model phonemes and their use enables the step specified in box 65 to take place because the updating of the place marker by a model element occurs during a later iteration.

BOX 66

The samples produced in box 61 are compared with the network stored in network store 51 to select a best path.

BOX 67

The best path is output at box 67.

The iteration illustrated in FIG. 6 is repeated for as long as signal is received to keep the process going. In order to help detect the end it is appropriate to include model phonemes which represent channel noise and breath sound. At the start, e.g. before speech is received, the network is initialised using a standard, predetermined configuration. The "silent" elements are particularly suitable for initialisation.

Figure 7:
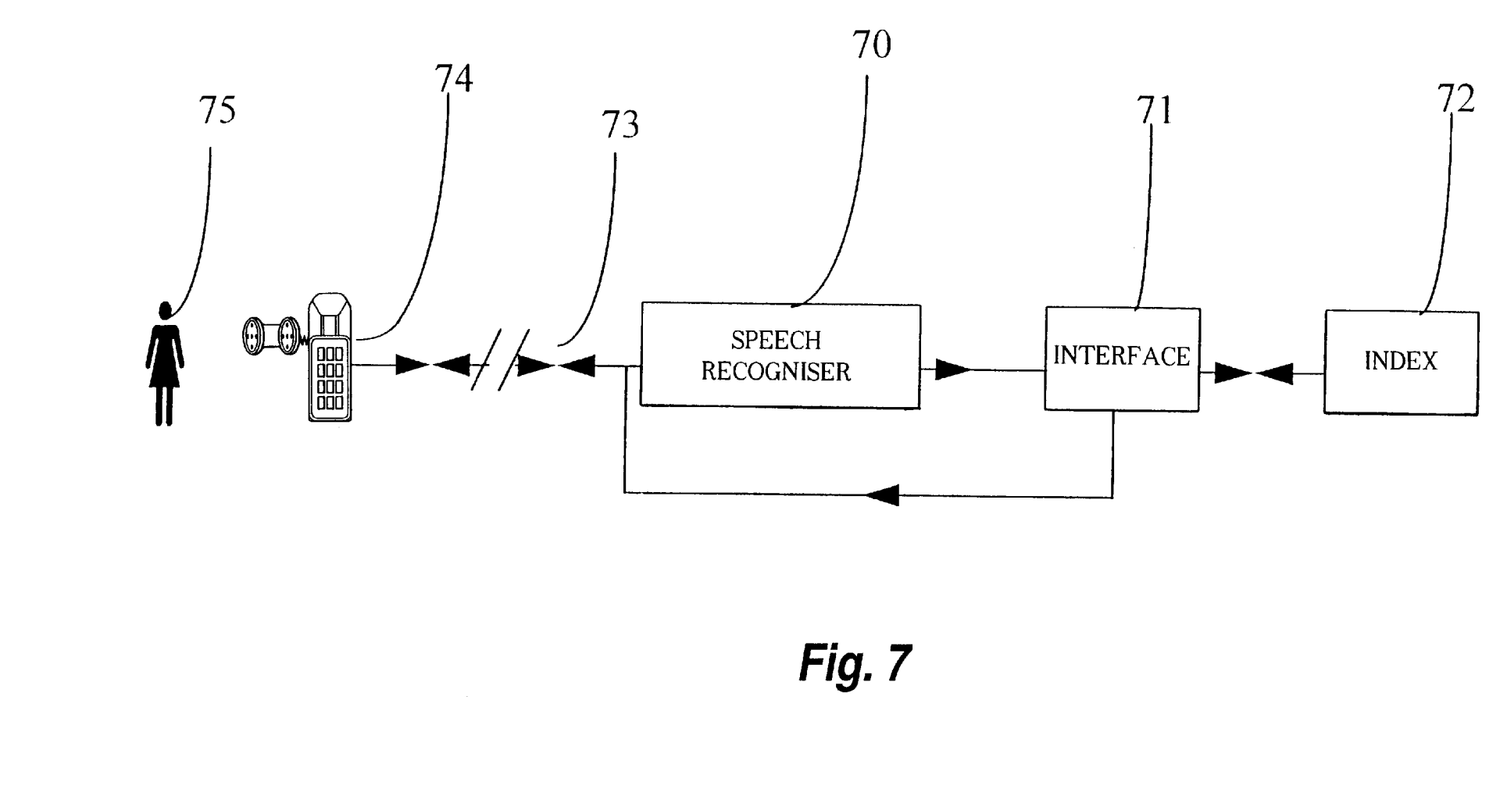
FIG. 7 illustrates the invention in the context of a telecommunications system.

FIG. 7 illustrates the use of the invention as automatic voice control either directly or via a telecommunications system, e.g. for directory enquiries or other similar service such as railway timetables or airline services.

A speech recogniser 70 according to the invention is connected to an interface 71 which is adapted to control an index 72 by means of instructions received as speech and identified by the recogniser 70. The recogniser 70 and the interface 71 are connected to a telecommunications system 73 which includes a distant telephone 74 available to a user 75. To interrogate the index 72, the user 75, (by conventional telecommunications technology), accesses the recogniser 70. Spoken requests are transmitted to the recogniser by the system 73. These are identified by the recogniser 70 and passed to the index 72 via the interface 71. Results are returned to the user 75 via the interface 71 and the system 73.

In some applications it is desirable to provide the possibility of checking that instructions have been correctly understood, e.g. by means of a feedback loop. This is conveniently achieved by incorporating a synthetic speech facility in the recogniser 70. This enables the recogniser to identify its interpretations to the user, if necessary via a telecommunications system. It is also possible to display the interpretations on a screen. This checking is inherent in applications such as automatic dictation, especially when the resulting text is displayed on a screen.

In most of these applications there is a possibility that the speech will not be recognised at all. This is regarded as an acceptable result, particularly when this circumstance is notified to the user.

I claim:

1. A method of recognizing a speech signal, which method comprises the following steps:

(a) receiving said signal and dividing the speech signal into a succession of samples;

(b) preparing a plurality of paths, each of which comprises a succession of model linguistic elements, where said models are in a form suitable for comparison with the samples;

(c) comparing the samples with the paths to assess the closeness of match between individual paths and the received signal;

(d) selecting a path which constitutes a best match for the received signal;

wherein at least some of the model linguistic elements are context related and account for one or more of the following elements in the corresponding succession of model linguistic elements and wherein other elements in the paths are designated by place markers which define linguistic elements in a form not suitable for said comparison in step (c), and the place markers are inserted into the paths prepared in step (b), and thereafter the linguistic elements defined by said place markers are converted to model linguistic elements that are context related, and suitable for a comparison in step (c).

2. A method according to claim 1, wherein each context related model linguistic element is based on a triphone consisting of a center element, a left element and a right element;

wherein the model linguistic element relating to the center element is in the context of the right and left elements.

3. A method according to claim 1, wherein extensions are added to said paths at locations identified by place markers already in the paths, and at least one of the extensions comprises a string of one or more model linguistic elements and a new place marker, wherein one of the elements of the string is a conversion of the linguistic elements defined by the place marker in the path, and the new place marker identifies a location for future extensions of said path.

4. A method according to claim 1, wherein in the paths are organized as a network.

5. A method according to claim 1, wherein each sample from step (a) is in the form of parameters representing the linguistic nature of the sample.

6. A method according to claim 1, wherein the speech signal is received from a telecommunications system.

7. A method according to claim 1, which includes as step (e) the generation of responses to identify the result of the recognition in step (d).

8. A method according to claim 7, wherein the said responses include an indication that the input was not identified.

9. A method according to claim 1, which further includes steps:

(f) the transmission of the result of the recognition of the best path in step (d) to a computerized index, (g) the retrieval of information from the index, and, (h) the output of the retrieved information.

10. A method according to claim 9, which further includes as step (i) transmitting the retrieved information via a telecommunications system.

11. A method of extending a path comprising model elements suitable for comparison with a speech signal by a speech recognition processor, which method comprises the steps of:

(a) the processor inserting in the path, during one extension thereof, a place marker defining a symbolic element, and (b) the processor, during a later extension, replacing the symbolic element with a model element, where a first model element of said later extension is the model element replacing the symbolic element in the place marker.

12. A method according to claim 11, wherein each extension is added at a location indicated by a place marker.

13. Apparatus for recognizing a speech signal which apparatus comprises:

(a) a receiver for acquiring the speech signal for conversion, (b) a parametizer connected to the receiver for converting the acquired signal into a succession of samples in the form of parameters relating to a linguistic nature of the sample, (c) a path store for containing a plurality of paths said paths comprising model linguistic elements in a form suitable for comparison with parameterized samples and place markers defining linguistic elements in a form not suitable for comparison, (d) an extender for producing extensions to paths contained in the path store, (e) a converter for converting extensions produced by the extender into context related model elements and place markers for elements not having an adequately defined context, said converter also being operationally linked to the path store to add said conversions to the network contained in the path store;

(f) a comparator operationally linked to the parametizer and path store for comparing the samples with the paths to select the best match.

14. An apparatus according to claim 13, wherein the converter includes a lexicon store having a plurality of storage locations each of which contains signals defining a linguistic unit recognizable by the apparatus.

15. An apparatus according to claim 13, wherein the converter contains a triphone store having an access section based on triphones and an output section containing signals defining a model element equivalent to the central element of the triphone.

16. Apparatus according to claim 13, which is connected to a telecommunications system.

17. A method to recognize an input speech signal, which method comprises the following steps:

(a) dividing the input speech signal into a succession of speech samples;

(b) generating a plurality of paths each of which include a succession of model linguistic elements, where said model linguistic elements are each selected based on the context of a corresponding individual speech sample and at least one subsequent speech sample;

(c) as the paths are generated, inserting in a path a place marker that defines a linguistic element in a form not suitable for comparison, to designate a speech signal sample lacking a context of a subsequent speech sample;

(d) comparing the samples with the paths to assess the closeness of match between individual paths and the input speech signal, but exempting from the comparison linguistic elements in the path defined by the place marker;

(e) after step (d), converting the place marker to a model linguistic element and comparing the model linguistic element in a subsequent iteration of step (d);

(f) repeating steps (b) to (e) to select a best match between an individual path and the input speech signal, which best match is used to generate a recognized speech signal.

18. A method to recognize an input speech signal as in claim 17 further comprising the steps of:

(g) after step (c), branching an extension of further model linguistic elements from the place marker in a path, and (h) placing another place marker at the end of the extension.

19. A method to recognize an input speech signal as in claim 17, wherein each model linguistic element is based on a triphone of three model linguistic elements including a center element, where the center element is in the context of a left and right element.

20. A method to recognize an input speech signal according to claim 17, wherein in the paths form a branched network.

21. A method to recognize an input speech signal according to claim 17, wherein the steps are performed in real-time as the input speech signal is being received, and the paths are being generated.

22. A method to recognize an input speech signal according to claim 17, wherein the input speech is received from a telecommunications system.

* * * * *